US011951765B1

(12) United States Patent
Yang et al.

(10) Patent No.: US 11,951,765 B1
(45) Date of Patent: Apr. 9, 2024

(54) BLACKBOARD ERASER CLEANER

(71) Applicant: ZHEJIANG UNIVERSITY, Hangzhou (CN)

(72) Inventors: Qinmin Yang, Hangzhou (CN); Qi Qiu, Hangzhou (CN); Hao Chen, Hangzhou (CN); Mingbin Gong, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/357,177

(22) Filed: Jul. 24, 2023

(30) Foreign Application Priority Data

Oct. 27, 2022 (CN) ........................ 202211323457.7

(51) Int. Cl.

| | |
|---|---|
| ***B43L 19/00*** | (2006.01) |
| ***A47L 7/00*** | (2006.01) |
| ***A47L 9/14*** | (2006.01) |
| ***A47L 9/22*** | (2006.01) |
| ***B08B 1/00*** | (2006.01) |
| ***B08B 1/04*** | (2006.01) |
| ***B08B 5/04*** | (2006.01) |
| ***B08B 7/02*** | (2006.01) |
| ***B08B 7/04*** | (2006.01) |

(52) U.S. Cl.

CPC ......... *B43L 19/0037* (2013.01); *A47L 7/0047* (2013.01); *A47L 7/0085* (2013.01); *A47L 9/149* (2013.01); *A47L 9/22* (2013.01); *B08B 1/002* (2013.01); *B08B 1/04* (2013.01); *B08B 5/04* (2013.01); *B08B 7/02* (2013.01); *B08B 7/04* (2013.01)

(58) Field of Classification Search

CPC ...... B43L 21/02; B43L 19/0037; B43L 19/00; A47L 7/0047; A47L 11/4013; A47L 13/502; B08B 7/02; B08B 5/04

See application file for complete search history.

(56) References Cited

FOREIGN PATENT DOCUMENTS

| | | | | | |
|---|---|---|---|---|---|
| CN | 201799424 U | * | 4/2011 | | |
| CN | 201979970 U | | 9/2011 | | |
| CN | 102962218 A | | 3/2013 | | |
| CN | 105344667 A | | 2/2016 | | |
| CN | 108543774 A | * | 9/2018 | ......... | B01D 46/0053 |
| CN | 111717469 A | | 9/2020 | | |

(Continued)

OTHER PUBLICATIONS

CN-108543774-A English Translation (Year: 2018).*
CN-201799424-U English Translation (Year: 2011).*

*Primary Examiner* — Tom Rodgers
*Assistant Examiner* — Makena S Markman

(57) ABSTRACT

A blackboard eraser cleaning device is provided and includes an outer shell (1). A cover (2) is arranged at the upper part of the outer shell (1), an inner shell (3) is arranged inside the outer shell (1). A clamping mechanism (19) is arranged at the upper end of the inner shell (3). A leaning station (8) is defined inside the clamping mechanism (19). A cylinder (9) is arranged around the clamping mechanism (19). A height adjustment mechanism (10) is arranged inside the outer shell (1). The height adjustment mechanism (10) includes a servo (101) arranged inside the outer shell (1) and located on a side of the inner shell (3). According to the present application, a variety of cleaning modes may be achieved to meet the actual usage of the blackboard eraser.

7 Claims, 5 Drawing Sheets

(56) References Cited

FOREIGN PATENT DOCUMENTS

| | | | | |
|---|---|---|---|---|
| CN | 214208826 | U | 9/2021 | |
| KR | 20180066630 | A | 6/2018 | |
| WO | WO-2004062818 | A2 * | 7/2004 | ............... B08B 7/02 |

* cited by examiner

BLACKBOARD ERASER CLEANER

CROSS REFERENCE TO RELATED APPLICATIONS

The present disclosure claims priority of Chinese patent application No. 202211323457.7, filed on Oct. 27, 2022, and contents of which are incorporated herein by its entireties.

TECHNICAL FIELD

The present disclosure relates to the field of teaching tools, and in particular to a blackboard eraser cleaner.

BACKGROUND

Multimedia teaching does not meet all requirements of daily course teaching. Most of the teaching is still performed based on blackboards. While teaching students based on blackboards, teachers need to use chalks to write on the blackboards. Erasing the blackboards after the writing is a troublesome task, and a blackboard eraser also needs to be cleaned regularly. For a blackboard eraser cleaning device in the art, a spacing between the tapping board and the clamping box is fixed. The spacing cannot be effectively adjusted, a variety of cleaning modes cannot be achieved. When a teacher is in a hurry to use the blackboard eraser, the blackboard eraser cannot be removed out of the cleaning device to be used in time, and the teaching may be affected.

SUMMARY OF THE DISCLOSURE

The present disclosure provides a blackboard eraser cleaning device. On one hand, the blackboard eraser may be cleaned more effectively and efficiently. On the other hand, a variety of cleaning modes may be achieved, meeting actual use of blackboard eraser.

The present disclosure provides a blackboard eraser cleaning device, including an outer shell. A cover is arranged at an upper portion of the outer shell, the outer shell is arranged with an inner shell. A clamping mechanism is arranged at an upper end of the inner shell. A cleaning station is defined inside the clamping mechanism. A cylinder is disposed around the clamping mechanism. A height adjustment mechanism is arranged inside the outer shell. The height adjustment mechanism includes a servo arranged inside the outer shell and disposed on a side of the inner shell. A first tray is arranged at a projecting end of the servo. A spool is arranged inside the cylinder. An upper end of the spool is connected to the top of the outer shell by a nut. A second spool is arranged at a lower end of the spool. The spool is arranged with a positioning block. A spring sleeves the spool. An end of the spring is disposed inside the cylinder. The other end of the spring is arranged on the positioning block. The spool arranged on one side is connected with the spool arranged on the other side through belt transmission. The first tray and the second tray on one of the two sides are wound with fine lines. A standing plate is arranged inside outer shell. The standing plate is arranged with a tapping mechanism. An output end of the tapping mechanism is disposed inside the inner shell and corresponds to a sponge part of the blackboard eraser. A dust vacuum mechanism is arranged at a bottom of the inner shell and located below the tapping mechanism.

In some embodiments, the tapping mechanism includes a tapping motor arranged on the standing plate. A tapping assembly is arranged symmetrically in the inner shell via a bearing. An end of the tapping assembly is arranged with gear, the gears of two sides are engaged with each other, a projecting end of the tapping motor is connected to an end of the tapping assembly. The tapping assembly corresponds to a position where the cleaning station is located.

In some embodiments, the tapping assembly includes a tapping shaft arranged inside the inner shell, and the tapping shaft is arranged with tapping blocks having brushes.

In some embodiments, a larger number of the tapping blocks are disposed in a middle of the tapping shaft, and a smaller number of the tapping blocks are disposed at two sides of the tapping shaft.

In some embodiments, the dust vacuum mechanism includes a tubing member arranged on a side of the inner shell. A fan having its own high-speed motor is arranged inside the tubing member. A pull-out powder storage box is arranged inside the inner shell and located below the tapping mechanism, an end of the powder storage box defines a through hole, and a position where the through hole is defined corresponds to a position where the fan is arranged.

In some embodiments, the clamping mechanism includes a board eraser support arranged at the upper end of the inner shell, a side plate of the board eraser support defines a rotating recess, a hook fixed shaft is rotatably arranged inside the rotating recess, the hook fixed shaft is arranged with a hook plate through a torsion spring, and the cleaning station is defined by a plurality of hook plates.

In some embodiments, a storage shelf is arranged on a side of the outer shell, a first shelf is arranged on the storage shelf for a chalk box to be placed, and a second shelf is arranged on the storage shelf for the blackboard eraser to be placed.

In some embodiments, a first magnet is arranged at a bottom edge of the cover, a second magnet is arranged at a top inner edge of the outer shell, and the first magnet and the second magnet are configured to cooperate with each other.

1. In the present disclosure, the blackboard eraser is placed in the cleaning station. The blackboard eraser is effectively clamped by the clamping mechanism. According to the actual usage demand, the fast cleaning mode or the deep cleaning mode may be selected. For the fast cleaning mode, the servo is rotating, and the spool and fine line perform transmission, such that the spool is driven to rotate. The upper end of the spool is connected to the top of the outer shell through the nut. The spool is rotating to drive the positioning block and the spring to move upward slightly. The spring cause the cylinder and the clamping mechanism to move upwards for a certain distance. In this way, the distance between the tapping mechanism and the blackboard eraser increases. The active end of the tapping mechanism slightly touches the sponge part of the blackboard eraser to fast clean the blackboard eraser. For the deep cleaning mode, the servo rotates to the other side, and the spool and fine line performs transmission, such that the spool is rotating reversely and moves downwards slightly. The clamping mechanism also moves slightly along with the spool. The distance between the blackboard eraser and the tapping mechanism decreases. The active end of the tapping mechanism comes into full contact with the sponge part of the blackboard eraser, removing the dust from the blackboard eraser deeply. The dust that is removed by tapping is collected through a dust vacuum mechanism. By adjusting the clamping mechanism and the tapping mechanism, the distance between the blackboard eraser and the tapping portion is adjusted to some extent, such that various cleaning modes can be achieved to meet practical needs.

The spring is arranged on the spool. When the tapping mechanism taps the blackboard eraser, the clamping mechanism may move up and down reciprocally. In this way, vibration is generated, allowing the dust on the blackboard eraser to fall off effectively, enhancing the cleaning effect.

The tapping blocks arranged on the tapping shaft, more tapping blocks are arranged at the middle of the tapping shaft, and fewer tapping blocks are arranged at two sides of the tapping shaft. Generally, after being used, the dust may be concentrated in the middle of the blackboard eraser. Therefore, more tapping blocks are arranged in the middle of the tapping shaft, such that the dust may be removed more effectively from the blackboard eraser.

In the clamping mechanism, the blackboard eraser is placed into the cleaning station defined by a plurality of hook plates. The blackboard eraser is pressed downwards, and the torsion spring on the hook plate is pressed. After the blackboard eraser is released, the hook plates are reset under the action of the torsion spring, and the hooks on the hook plates are stuck in the gap between the outer shell and the sponge part of the blackboard eraser. The blackboard eraser is effectively clamped and may be adapted to forces that are applied downwardly in four directions, such that the clamping tolerance may be improved.

Figure 1:
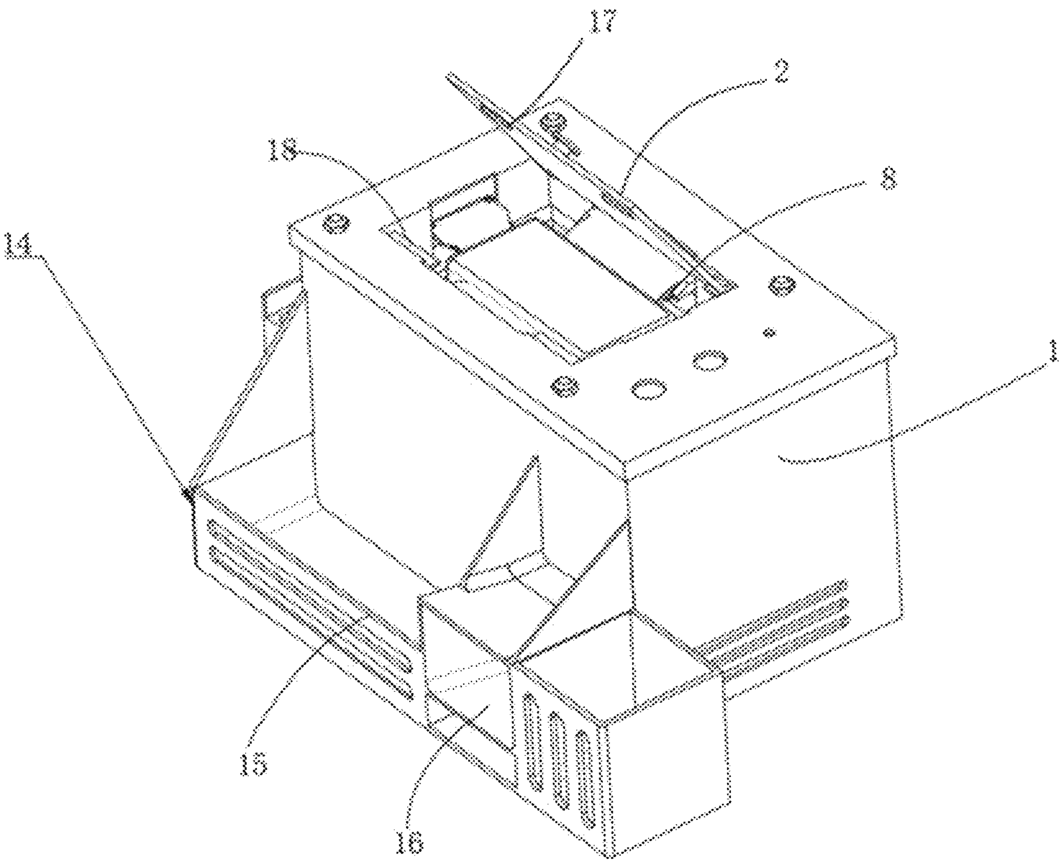
FIG. 1 is a structural schematic view of the cleaning device according to an embodiment of the present disclosure.

Reference numerals in the drawings: 1—Outer shell, 2—Cover, 3—Inner shell, 4—Eraser support, 5—Rotating recess, 6—Hook fixed shaft, 7—Hook plate, 8—Cleaning station, 9—Cylinder, 10—Height adjustment mechanism, 11—Standing plate, 12—Tapping mechanism, 13—Dust vacuum mechanism, 14—Storage shelf, 15—First shelf, 16—Second shelf, 17—First magnet, 18—Second magnet, 19—Clamping mechanism, 121—Tapping motor, 122—Tapping assembly, 123—Gear, 124—Tapping shaft, 125—Tapping block, 131—Tube member, 132—Fan, 133—Powder storage box, 134—Through hole, 101—Servo, 102—First tray, 103—Spool, 104—Second tray, 105—Positioning block, 106—Spring, 107—Fine line.

DETAILED DESCRIPTION

The present disclosure is further described below by referring to the accompanying drawings and embodiments, but the drawings and the embodiments are not basis for limiting the present disclosure.

Figure 2:
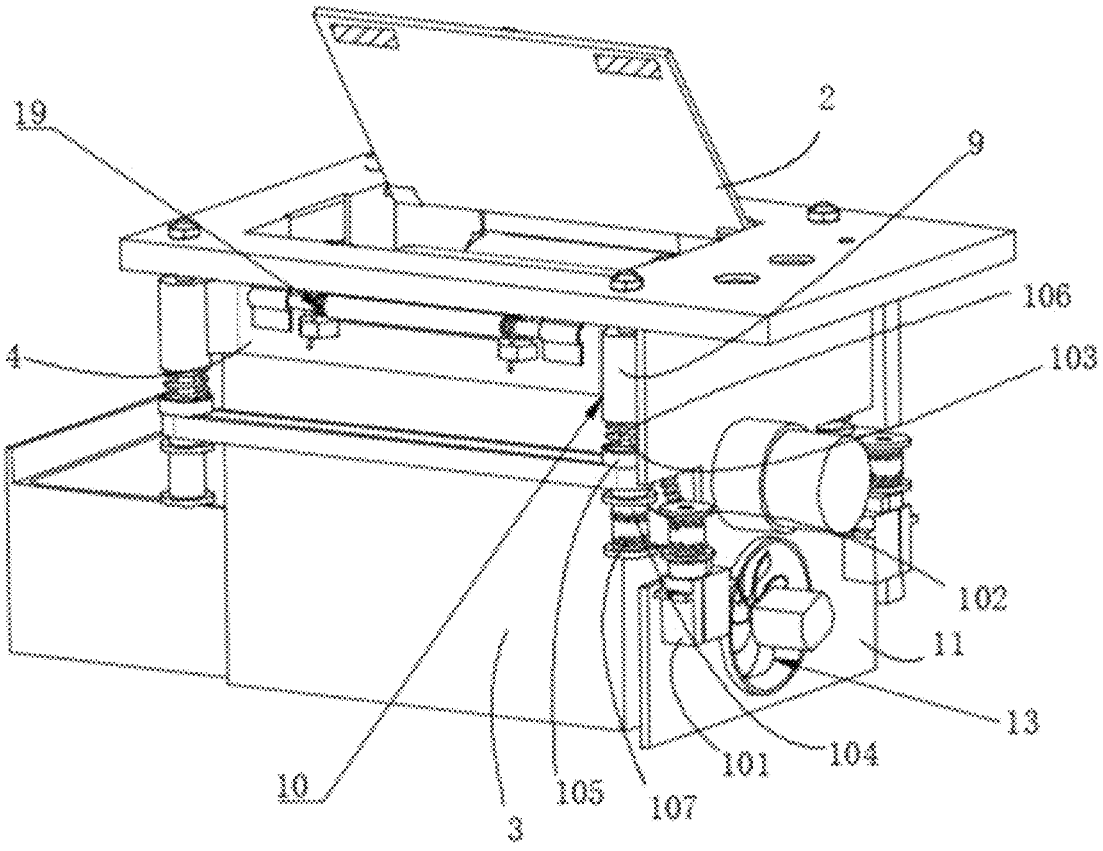
FIG. 2 is a structural schematic view of the height adjustment mechanism according to an embodiment of the present disclosure.

Embodiments: The blackboard eraser cleaning device includes an outer shell 1, as shown in FIG. 1 and FIG. 2. A cover 2 covers an upper portion of the outer shell 1. A standing plate 11 is arranged inside the outer shell 1. A first magnet 17 is arranged at a bottom edge of the cover 2. A second magnet 18 is arranged at a top inner edge of the outer shell 1. The first magnet 17 and the second magnet 18 cooperate with each other. Placement of the magnets is configured to open and close the cover, such that the cover may be opened and closed quickly and effectively. The outer shell 1 is arranged with an inner shell 3. A clamping mechanism 19 is arranged at an upper end of the inner shell 3. A cleaning station 8 is defined inside the clamping mechanism 19. A cylinder is disposed around the clamping mechanism. A height adjustment mechanism 10 is arranged inside the outer shell 1. The height adjustment mechanism 10 includes a servo 101 arranged on the standing plate 11. A first tray 102 is arranged at a projecting end of the servo 101. A spool 103 is arranged inside the cylinder 9. An upper end of the spool 103 is connected to the top of the outer shell 1 by a nut. A second spool 104 is arranged at a lower end of the spool 103. The spool 103 is arranged with a positioning block 105. A spring 106 sleeves the spool 103. An end of the spring 106 is disposed inside the cylinder 9. A spring is arranged on the spool. When the tapping mechanism taps the blackboard eraser, the clamping mechanism may move up and down reciprocally to generate vibration, such that dust on the blackboard eraser may fall off effectively, enhancing the cleaning effect. The other end of the spring 106 is arranged on the positioning block 105. The spools 103 arranged on two sides are connected with each other through belt transmission. The first tray 102 and one second tray 104 on one of the two sides are wound with fine lines 107. The standing plate 11 is arranged with a tapping mechanism 12. An output end of the tapping mechanism 12 is disposed inside the inner shell 3 and corresponds to a sponge part of the blackboard eraser. A dust vacuum mechanism 13 is arranged at a bottom of the inner shell 3 and located below the tapping mechanism 12. The clamping mechanism moving up and down may be achieved by the fine lines being collected and released. A set of servos is arranged at each of two sides of the inner shell. Each of the first tray and the second tray is wound with two sets of fine lines. A rotation direction of the fine line on the upper side is different from a rotation direction of the fine line on the lower side. When the line at the lower side of the first tray is collected, the line on the upper side is released. When the line at the lower side of the second tray is released, the line at the upper side of the second tray is collected. When a direction of the servo changes, the servo rotates in an opposite direction. A digital tube is arranged on a side of the outer shell to display a time and a date.

Figure 5:
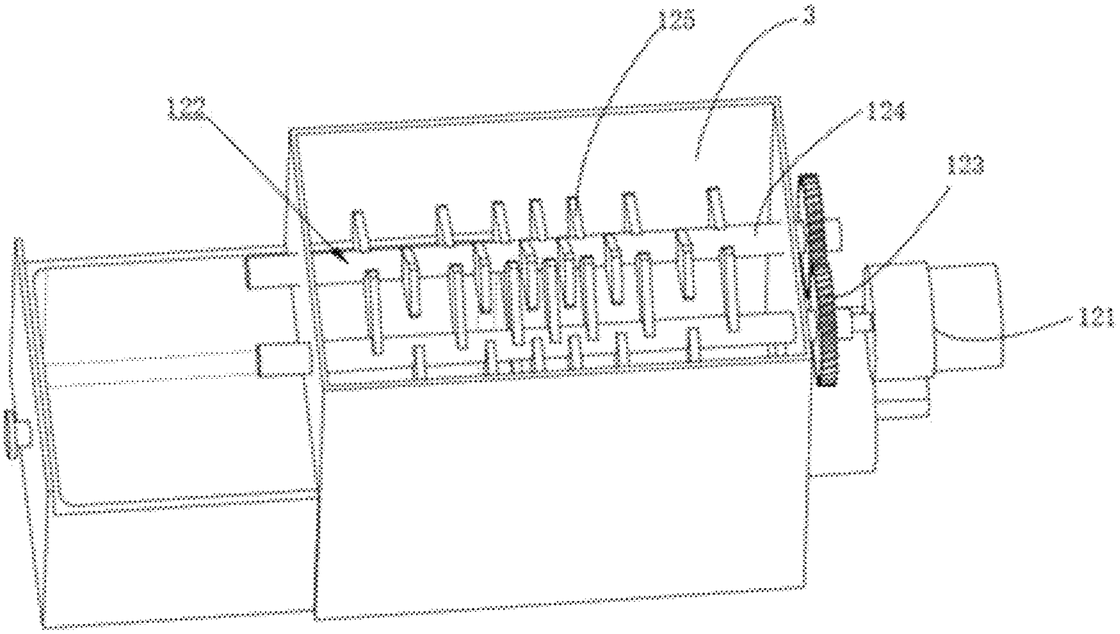
FIG. 5 is a structural schematic view of the tapping mechanism according to an embodiment of the present disclosure.

The tapping mechanism 12 includes a tapping motor 121 arranged on the standing plate 11, as shown in FIG. 5. A tapping assembly 122 is arranged symmetrically in the inner shell 3 via a bearing. An end of the tapping assembly 122 is arranged with a gear 123. Gears 123 of two sides are engaged with each other. A projecting end of the tapping motor 121 is connected to an end of the tapping assembly 122. The tapping assembly 122 corresponds to a position where the cleaning station 8 above is located. The tapping assembly 122 includes a tapping shaft 124 arranged inside the inner shell 3. The tapping shaft 124 is arranged with tapping blocks 125 having brushes. The tapping motor drives the tapping shaft to rotate, and the tapping blocks on the tapping shaft rotates accordingly. The brushes on the tapping blocks brush the blackboard eraser to remove the dust. More tapping blocks 125 are disposed in the middle of the tapping shaft 124, and fewer tapping blocks 125 are disposed at two sides of the tapping shaft 124. Generally, after being used, the dust may be concentrated in the middle of the blackboard eraser. Therefore, more tapping blocks are arranged in the middle of the tapping shaft, such that the dust may be removed more effectively from the blackboard eraser.

Figure 6:
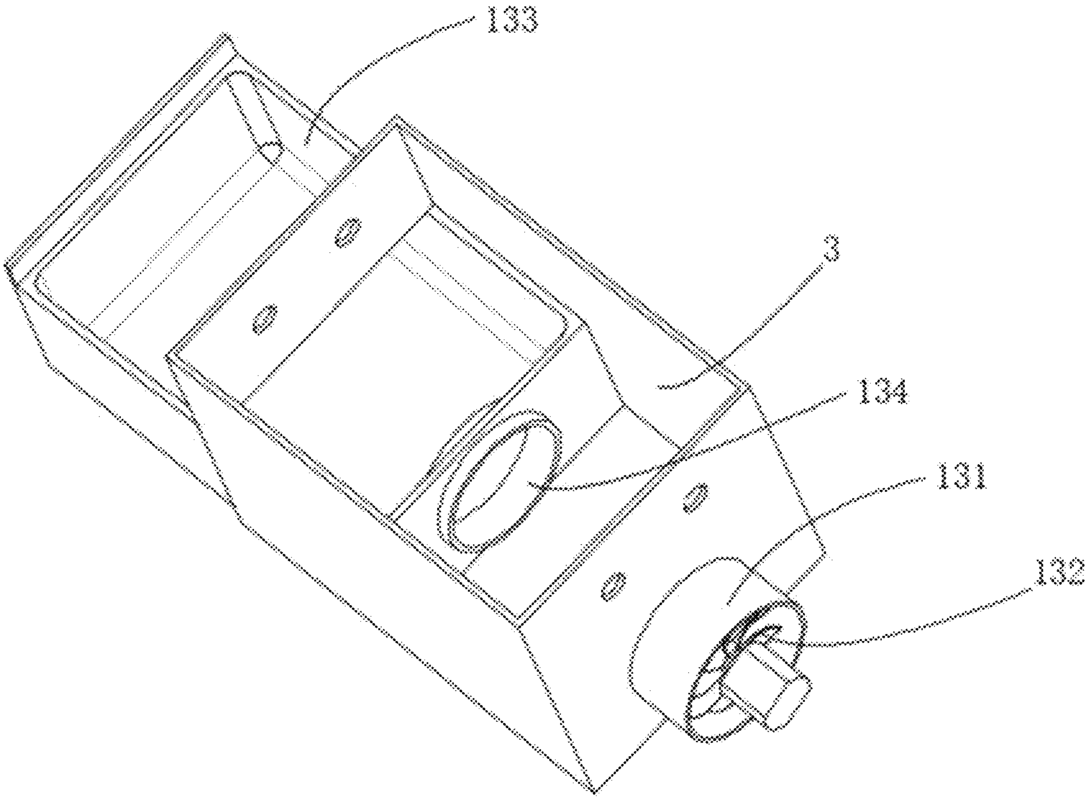
FIG. 6 is a structural schematic view of the dust vacuum mechanism according to an embodiment of the present disclosure.

The dust vacuum mechanism 13 includes a tubing member 131 arranged on a side of the inner shell 3, as shown in FIG. 6. A fan 132 having its own high-speed motor is arranged inside the tubing member 131. A pull-out powder storage box 133 is arranged inside the inner shell 3 and located below the tapping mechanism 12. An end of the powder storage box 133 defines a through hole 134. A screen net is arranged at each of two ends of the through hole. Since two screen nets are arranged, the vacuumized dust powder may not be leaked to an outside of the cleaning device and may be collected in the collection box effectively. The position where the through hole 134 is defined corresponds to the position where the fan 132 is arranged. When the fan is activated, the fan blows the fallen dust into the powder storage box. The powder storage box is pullable.

Figure 3:
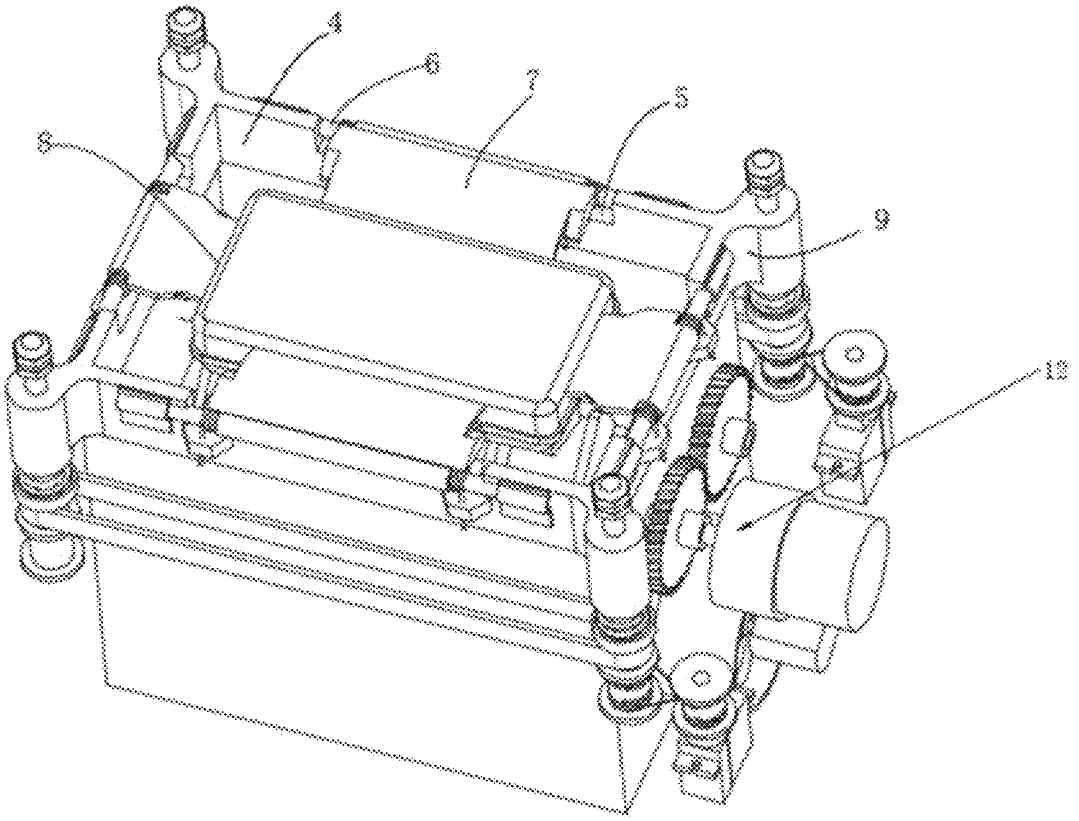
FIG. 3 is a structural schematic view of the clamping mechanism according to an embodiment of the present disclosure.
Figure 4:
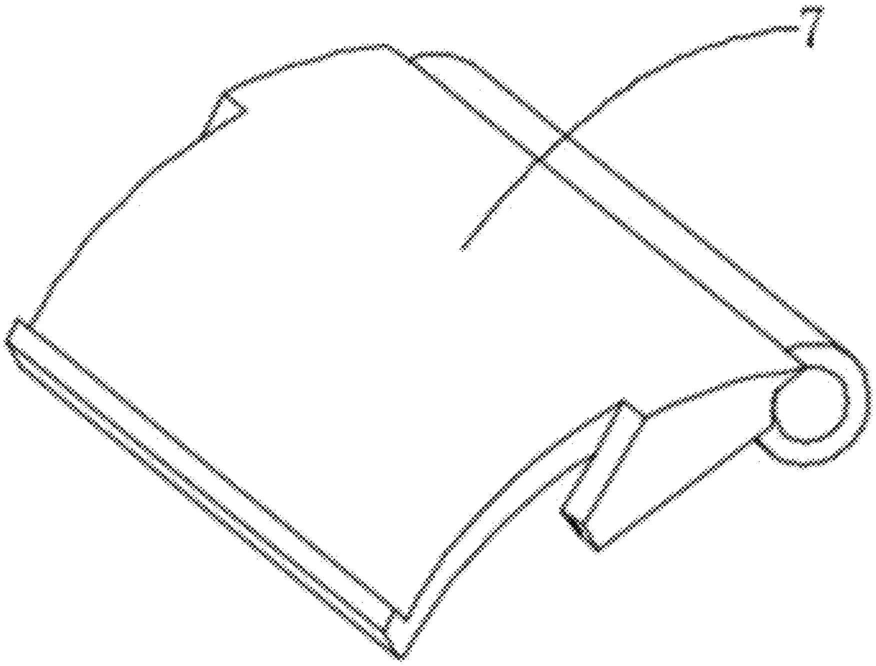
FIG. 4 is a structural schematic view of the hook plate according to an embodiment of the present disclosure.

The clamping mechanism includes a board eraser support 4 arranged at the upper end of the inner shell. As shown in FIG. 3 and FIG. 4, a side plate of the board eraser support 4 defines a rotating recess 5. A hook fixed shaft 6 is rotatably arranged inside the rotating recess 5. The hook fixed shaft 6 is arranged with a hook plate 7 through a torsion spring. The cleaning station is defined by a plurality of hook plates 7. An end of the hook plate is arranged with a hook. When the blackboard eraser is pressed downward, the torsion spring is deformed. When the blackboard eraser is further pressed downward, the hook contacts the gap at the connection between the outer shell and the sponge part. The hook hooks the outer shell, and under a force applied by the torsion spring, the hook on the hook plate rotates upwardly and is stuck between the outer shell and the sponge part of the blackboard eraser, such that the blackboard eraser is clamped tightly. Four corners of the board eraser support of the clamping mechanism has gaps. In order to prevent the dust from rising upwards, a film is arranged to cover each of the gaps at the four corners. A storage shelf 14 is arranged on a side of the outer shell 1. A first shelf 15 is arranged on the storage shelf 14, and a chalk box may be placed on the first shelf 15. A second shelf 16 is arranged on the storage shelf 14, and the blackboard eraser may be placed on the second shelf 16. In this way, the chalk box and the blackboard eraser may be placed. A slot is defined between the inner shell and the board eraser support, such that a position of the board eraser support may be limited to some extent.

The present disclosure provides two main cleaning modes. 1. Fast cleaning mode: The height of the eraser is adjusted (slightly upward), such that the eraser slightly contacts the tapping assembly. The eraser is slightly brushed by hard brushes for 30 seconds. A rotation speed of the tapping shaft is 300 revolutions per minute. A rotation speed of the fan is 15,000 revolutions per minute. 2. Deep cleaning mode: The height of the eraser is adjusted (slightly downward), such that the eraser completely contacts the tapping assembly. In this way, the tapping assembly may tap the eraser much harder. Further, the eraser may move up and down more severely, for 1 minute and 30 seconds, the rotation speed of the tapping shaft is 600 revolutions per minute, and the rotation speed of the fan is 3000 revolutions per minute.

The working principle of the present disclosure is as follows: The blackboard eraser is placed in the cleaning station. When the blackboard eraser is placed in the cleaning station and is pressed downward, the torsion spring is deformed. When the blackboard eraser is further pressed downward, the gap at the connection between the outer shell and the sponge part contacts the hook. The hook hooks the outer shell, and under the force applied by the torsion spring, the hook on the hook plate rotates upwardly, and the hook is stuck between the outer shell and the sponge part of the blackboard eraser, such that the blackboard eraser is clamped tightly. According to the actual usage demand, the fast cleaning mode or the deep cleaning mode can be selected. For the fast cleaning mode, the servo is rotating, and the spool and fine line perform transmission, such that the spool is driven to rotate. The upper end of the spool is connected to the top of the outer shell through the nut. The spool is rotating to drive the positioning block and the spring to move upward slightly. The spring causes the cylinder and the clamping mechanism to move upwards for a certain distance. In this way, the distance between the tapping mechanism and the blackboard eraser increases. The active end of the tapping mechanism slightly touches the sponge part of the blackboard eraser to fast clean the blackboard eraser. For the deep cleaning mode, the servo rotates to the other side, and the spool and fine line performs transmission, such that the spool is rotating reversely and moves downwards slightly. The clamping mechanism also moves slightly along with the spool. The distance between the blackboard eraser and the tapping mechanism decreases. The active end of the tapping mechanism comes into full contact with the sponge part of the blackboard eraser, removing the dust from the blackboard eraser deeply. The dust that is removed by tapping is collected through a dust vacuum mechanism. By adjusting the clamping mechanism and the tapping mechanism, the distance between the blackboard eraser and the tapping portion is adjusted to some extent, such that various cleaning modes can be achieved to meet practical needs.

What is claimed is:

1. A blackboard eraser cleaning device, comprising: an outer shell (1), wherein, a cover (2) is arranged at an upper portion of the outer shell (1), the outer shell (1) is arranged with an inner shell (3), a standing plate (11) is arranged inside the outer shell (1);

a clamping mechanism (19) is arranged at an upper end of the inner shell (3), a cleaning station (8) is defined inside the clamping mechanism (19), a cylinder (9) is disposed around the clamping mechanism (19), a height adjustment mechanism (10) is arranged inside the outer shell (1), the height adjustment mechanism (10) comprises a steering engine (101) arranged on the standing plate (11), a first tray (102) is arranged at a projecting end of the steering engine (101), a first spool (103) is arranged inside the cylinder (9), an upper end of the first spool (103) is connected to the top of the outer shell (1), a second spool (104) is arranged at a lower end of the first spool (103) and connected to the first spool;

the first spool (103) is arranged with a positioning block (105), a spring (106) sleeves the first spool (103), an end of the spring (106) is disposed inside the cylinder (9), the other end of the spring (106) is arranged on the positioning block (105), the first tray (102) and a second tray on one side are wound with fine lines (107);

the standing plate (11) is arranged with a tapping mechanism (12), an output end of the tapping mechanism (12) is disposed inside the inner shell (3) and disposed at a position capable of cleaning a to-be-cleaned part of the blackboard eraser, a dust vacuum mechanism (13) is arranged at a bottom of the inner shell (3) and located below the tapping mechanism (12);

the clamping mechanism (19) comprises a board eraser support (4) arranged at the upper end of the inner shell (3), a side plate of the board eraser support (4) defines a rotating recess (5), a hook fixed shaft (6) is rotatably arranged inside the rotating recess (5), the hook fixed shaft (6) is arranged with a hook plate (7) through a torsion spring, and the cleaning station is defined by a plurality of hook plates (7).

2. The blackboard eraser cleaning device according to claim 1, wherein the tapping mechanism (12) comprises a tapping motor (121) arranged on the standing plate (11), a tapping assembly (122) is arranged symmetrically in the inner shell (3) via a bearing, an end of the tapping assembly (122) is arranged with gear (123), the gears (123) of two sides are engaged with each other, a projecting end of the tapping motor (121) is connected to an end of the tapping assembly (122), and the tapping assembly (122) corresponds to a position where the cleaning station (8) is located.

3. The blackboard eraser cleaning device according to claim 2, wherein the tapping assembly (122) comprises a tapping shaft (124) arranged inside the inner shell (3), and the tapping shaft (124) is arranged with tapping blocks (125) having brushes.

4. The blackboard eraser cleaning device according to claim 3, wherein a larger number of the tapping blocks (125) are disposed in a middle of the tapping shaft (124), and a smaller number of the tapping blocks (125) are disposed at two sides of the tapping shaft (124).

5. The blackboard eraser cleaning device according to claim 1, wherein the dust vacuum mechanism (13) comprises a tubing member (131) arranged on a side of the inner shell (3), a fan (132) having its own high-speed motor is arranged inside the tubing member (131), a pull-out powder storage box (133) is arranged inside the inner shell (3) and located below the tapping mechanism (12), an end of the powder storage box (133) defines a through hole (134), and a position where the through hole (134) is defined corresponds to a position where the fan (132) is arranged.

6. The blackboard eraser cleaning device according to claim 1, wherein a storage shelf (14) is arranged on a side of the outer shell (1), a first shelf (15) is arranged on the storage shelf (14) for a chalk box to be placed, and a second shelf (16) is arranged on the storage shelf (14) for the blackboard eraser to be placed.

7. The blackboard eraser cleaning device according to claim 1, wherein a first magnet (17) is arranged at a bottom edge of the cover (2), a second magnet (18) is arranged at a top inner edge of the outer shell (1), and the first magnet (17) and the second magnet (18) are configured to cooperate with each other.

* * * * *